(12) United States Patent
Chien et al.

(10) Patent No.: US 12,537,403 B2
(45) Date of Patent: Jan. 27, 2026

(54) ROTOR STRUCTURE AND ROTOR MANUFACTURING METHOD

(71) Applicant: DELTA ELECTRONICS, INC., Taoyuan (TW)

(72) Inventors: Chia-Yen Chien, Taoyuan (TW); Tzu-Ting Hsu, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 251 days.

(21) Appl. No.: 18/334,397

(22) Filed: Jun. 14, 2023

(65) Prior Publication Data

US 2024/0106287 A1 Mar. 28, 2024

Related U.S. Application Data

(60) Provisional application No. 63/377,351, filed on Sep. 28, 2022.

(30) Foreign Application Priority Data

Apr. 21, 2023 (CN) .......................... 202310436065.X

(51) Int. Cl.
*H02K 1/276* (2022.01)
*H02K 1/28* (2006.01)
(Continued)

(52) U.S. Cl.
CPC ............... *H02K 1/276* (2013.01); *H02K 1/28* (2013.01); *H02K 1/32* (2013.01); *H02K 15/03* (2013.01); *H02K 15/12* (2013.01)

(58) Field of Classification Search
CPC ........... H02K 1/32; H02K 1/28; H02K 1/276; H02K 15/03; H02K 15/12; H02K 2201/06
(Continued)

(56) References Cited

U.S. PATENT DOCUMENTS 6,047,460 A 4/2000 Nagate et al.
6,392,324 B1 * 5/2002 Kuwahara ................ H02K 1/30
310/268

(Continued)

FOREIGN PATENT DOCUMENTS

CN 102545435 A 7/2012
CN 101656448 B 10/2012
(Continued)

*Primary Examiner* — Alex W Mok
(74) *Attorney, Agent, or Firm* — CKC & Partners Co., LLC

(57) ABSTRACT

A rotor structure includes a laminated silicon steel sheet structure, end plates, a shaft and a thermoset plastic key. Each silicon steel sheet includes a shaft hole and at least one sheet matching portion, and the sheet matching portion is connected to the shaft hole. The shaft passes through the shaft holes of the silicon steel sheets and the at least one shaft matching portions aligned with the at least one sheet matching portion to form an axial-direction injection passageway. The end plate includes an injection port connected to the axial-direction injection passageway. The thermoset plastic key is formed in the axial-direction injection passageway formed of the aligned shaft matching portions and sheet matching portion by transfer injection molding. The injection material is filled in magnet slots for securing magnets. A rotor manufacturing process is also provided.

17 Claims, 9 Drawing Sheets

(51) Int. Cl.
*H02K 1/32* (2006.01)
*H02K 15/03* (2025.01)
*H02K 15/12* (2025.01)

(58) Field of Classification Search
USPC .................................................. 310/156.53
See application file for complete search history.

(56) References Cited

U.S. PATENT DOCUMENTS

| | | | | |
|---|---|---|---|---|
| 7,653,984 | B2* | 2/2010 | Amano | H02K 15/12 |
| | | | | 29/598 |
| 7,923,881 | B2* | 4/2011 | Ionel | H02K 1/276 |
| | | | | 310/156.79 |
| 8,179,010 | B2* | 5/2012 | Ogami | H02K 1/2766 |
| | | | | 29/598 |
| 10,505,420 | B2* | 12/2019 | Asahi | H02K 1/2766 |
| 10,666,102 | B2* | 5/2020 | Okamoto | H02K 1/276 |
| 10,797,553 | B2* | 10/2020 | Tsuruta | H02K 1/2781 |
| 10,819,172 | B2* | 10/2020 | Yazaki | H02K 15/021 |
| 2006/0138894 | A1* | 6/2006 | Harada | H02K 15/02 |
| | | | | 310/156.19 |
| 2008/0174200 | A1* | 7/2008 | Okamoto | H02K 15/02 |
| | | | | 29/598 |
| 2008/0238219 | A1 | 10/2008 | Seiki | |
| 2013/0127283 | A1* | 5/2013 | Matsumoto | H02K 1/2713 |
| | | | | 29/598 |
| 2013/0257184 | A1* | 10/2013 | Haga | H02K 15/03 |
| | | | | 310/43 |
| 2013/0334910 | A1* | 12/2013 | Takahashi | H02K 1/2766 |
| | | | | 29/598 |
| 2016/0365779 | A1* | 12/2016 | Watanabe | H02K 15/12 |
| 2017/0331338 | A1* | 11/2017 | Asahi | H02K 21/14 |
| 2019/0214875 | A1* | 7/2019 | Tsuruta | H02K 1/28 |
| 2019/0252936 | A1* | 8/2019 | Okamoto | H02K 1/28 |
| 2019/0372425 | A1 | 12/2019 | Tschida et al. | |
| 2020/0177038 | A1 | 6/2020 | Frohlich et al. | |
| 2021/0203200 | A1* | 7/2021 | Shiono | H02K 21/14 |

FOREIGN PATENT DOCUMENTS

| | | |
|---|---|---|
| CN | 103339840 A | 10/2013 |
| CN | 109417321 A | 3/2019 |
| CN | 110365134 A | 10/2019 |
| CN | 110431734 A | 11/2019 |
| CN | 110556944 A | 12/2019 |
| CN | 110875651 A | 3/2020 |
| CN | 111934456 A | 11/2020 |
| DE | 102008027758 A1 | 12/2009 |
| EP | 4016819 A1 | 6/2022 |
| TW | 201135093 A | 10/2011 |
| TW | 201444903 A | 12/2014 |

\* cited by examiner

ROTOR STRUCTURE AND ROTOR MANUFACTURING METHOD

CROSS-REFERENCE TO RELATED APPLICATION

This application claims priority to U.S. Provisional Application Ser. No. 63/377,351, filed Sep. 28, 2022, and China Application Serial Number 202310436065.X, filed Apr. 21, 2023, the disclosures of which are incorporated herein by reference in their entireties.

BACKGROUND

Field of Disclosure

The present disclosure relates to a rotor structure and a rotor manufacturing method.

Description of Related Art

A conventional silicon steel sheet laminated structure of the motor rotor and its rotating shaft is usually fixed by interference fit or metal keys. The interference fit process needs to heat the silicon steel sheet laminated structure to a high temperature to enlarge the shaft hole or place the shaft into liquid nitrogen to shrink the shaft diameter. If the amount of interference between the silicon steel sheet and the rotating shaft is too large, it is easy to cause deformation of the silicon steel sheet and residual stress. The metal key of the silicon steel plate is matched with the keyway of the rotating shaft. Because the metal key may be slippery in the keyway, only one side of the metal key is under force when rotor is operating. At this time, if the torque of the rotor is too large during operation, the risk of the metal key failure may occur.

In addition, conventional motor rotors use magnet glue to glue the magnets in the magnet slots of a single silicon steel sheet. After the magnet glue is cured, multiple silicon steel sheets equipped with magnets are stacked to form a silicon steel sheet laminated structure. Such kind of process tends to cause the magnet glue overflowed between the silicon steel sheets after the silicon steel sheets are laminated, resulting in gaps between the silicon steel sheets, allowing the cooling oil to overflow when the rotor is operating at high speed.

SUMMARY

The present disclosure provides a rotor structure and its manufacturing method to deal with the needs of the prior art problems.

In one or more embodiments, a rotor structure includes a silicon steel sheet laminated structure, an upper end plate, a lower end plate, a rotation shaft and a thermoset plastic key. The silicon steel sheet laminated structure includes a plurality of silicon steel sheets, wherein each silicon steel sheet has a shaft hole, at least one silicon steel sheet matching portion and a plurality of magnet slots for accommodating a plurality of magnets, and the at least one silicon steel sheet matching portion is connected to the shaft hole. The upper end plate and the lower end plate are axially located at two opposite ends of the silicon steel sheet laminated structure, and the upper end plate or the lower end plate is recessed with an end plate shaft hole, at least one injection port and at least one end plate injection route. The rotation shaft is arranged through the shaft holes and the end plate shaft holes, the rotation shaft has at least one shaft matching portion aligned with the silicon steel sheet matching portions of the silicon steel sheets to form an axial-direction injection passageway, wherein the at least one injection port is fluidly communicable with the at least one end plate injection route and the axial-direction injection passageway, and the at least one end plate injection route is fluidly communicable with the axial-direction injection passageway and the magnet slots. The thermoset plastic key in the axial-direction injection passageway is formed by the at least one shaft matching portion aligned with the silicon steel sheet matching portions, and an injection molding material filled between the magnet slots and the magnets, and the injection molding material being cured to secure the magnets.

In one or more embodiments, the rotation shaft further has at least one rotation shaft keyway extending in an axial direction, each of the silicon steel sheets has at least one metal key connected to the shaft hole, wherein the metal keys of the silicon steel sheets engaged with the at least one rotation shaft keyway, the metal keys of the silicon steel sheets are aligned with one another.

In one or more embodiments, the magnet slots of the silicon steel sheets are misaligned with one another, and the silicon steel sheet matching portions of the silicon steel sheets are aligned with one another.

In one or more embodiments, the at least one end plate injection route comprises a circular channel, a plurality of tooth structures, a plurality of first perfusion channels and a plurality of second perfusion channels.

In one or more embodiments, the tooth structures are formed at a side of the circular channel that is away from the end plate shaft hole, and the tooth structures are disposed in a circumferential direction of the upper end plate or the lower end plate.

In one or more embodiments, the first perfusion channels and the second perfusion channels are located at a side of the circular channel that is adjacent to the end plate shaft hole, and fluidly communicable with the circular channel.

In one or more embodiments, associated ones of the magnet slots of the silicon steel sheets are partially aligned in an axial direction, wherein the magnet slots at an outermost layer in the axial direction are fluidly communicable with the circular channel, the tooth structures, the first perfusion channels and the second perfusion channels.

In one or more embodiments, the at least one silicon steel sheet matching portion of an outermost silicon steel sheets in an axial direction is fluidly communicable with the second perfusion channels.

In one or more embodiments, each of the silicon steel sheets has a plurality of cooling channels each located between a corresponding pair of the first perfusion channels and the second perfusion channels, and surrounded by the circular channel.

In one or more embodiments, the at least one injection port is disposed radially between the magnet slots and the silicon steel sheet matching portion, and is arranged in a circumferential direction of the upper end plate or the lower end plate.

In one or more embodiments, a rotor manufacturing method includes steps of: (a) stacking a plurality of silicon steel sheets in sequence to form a silicon steel sheet laminated structure, and then stacking an upper end plate and a lower end plate at two opposite ends of the silicon steel sheet laminated structure in an axial direction, wherein each of the silicon steel sheets has a shaft hole, at least one silicon steel sheet matching portion, and a plurality of magnet slots, the at least one silicon steel sheet matching portion is connected to the shaft hole, and the silicon steel sheet matching portions in the silicon steel sheets are combined with the at least one shaft matching portion of the rotation shaft to form an axial-direction injection passageway, wherein the upper end plate or the lower end plate is recessed with an end plate shaft hole, at least one injection port and at least one end plate injection route, the at least one injection port is fluidly communicable with the at least one end plate injection route and the axial-direction injection passageway; (b) placing a plurality of magnets into the magnet slots respectively, wherein the at least one end plate injection route is fluidly communicable with the axial-direction injection passageway and the magnet slots; (c) preheating the silicon steel sheet laminated structure to reach a temperature suitable for injection molding; (d) injecting injection molding material from one end of the silicon steel sheet laminated structure in the axial direction to fill the axial-direction injection passageway, and curing the injection molding material to form a thermoset plastic key in the axial-direction injection passageway formed by the at least one shaft matching portion aligned with the silicon steel sheet matching portions; and (e) injecting injection molding material to fill up between the magnet slots and the magnets, and curing the injection molding material to secure the magnets.

In one or more embodiments, the step (a) inserts a dummy shaft when stacking the silicon steel sheets, and replaces the dummy shaft with the rotation shaft after the step (b).

In one or more embodiments, the magnets are magnetized after the step (e).

In sum, the rotor structure disclosed herein is used to fill the magnet slots and secure the magnets through a high-temperature injection molding of thermosetting plastics and to fill the gaps after hardening or curing. The manufacturing process of the rotor structure is simpler than the conventional way of applying magnet glue on a single silicon steel sheet to bond a magnet and then laminating multiple sheets. Thermosetting plastic can fill the gaps of the magnet slots and fix the magnet so as to reduce the risk of magnet fracture, and the strength of thermosetting plastic at high temperature is better than that of magnet glue. The manufacturing process of the rotor structure utilizes the axial force applied by the machine to perform the injection molding and heating until hardening or curing steps such that it is less likely to have plastic overflowed to cause gaps between the silicon steel sheets, which can reduce the risk of cooling oil leakage when the rotor is operating. The process of rotor structure can injection mold multiple laminated silicon steel sheets at one time. Compared with the magnet glue, which can only be coated in a single layer and then laminated in multiple layers, the production time is much shorter. The thermoset plastic key of the rotor structure can tightly fill the keyway fitting part on the shaft, and there is no such issue of unilateral contact force applied to the metal key. In some embodiments, multiple thermoset plastic keys can be used to disperse the motor torque to increase the safety of the motor. Thermoset plastic key can also replace the metal key and reduce design difficulty.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Reference will now be made in detail to the present embodiments of the disclosure, examples of which are illustrated in the accompanying drawings. Wherever possible, the same reference numbers are used through the drawings and the description to refer to the same or like parts.

Figure 1:
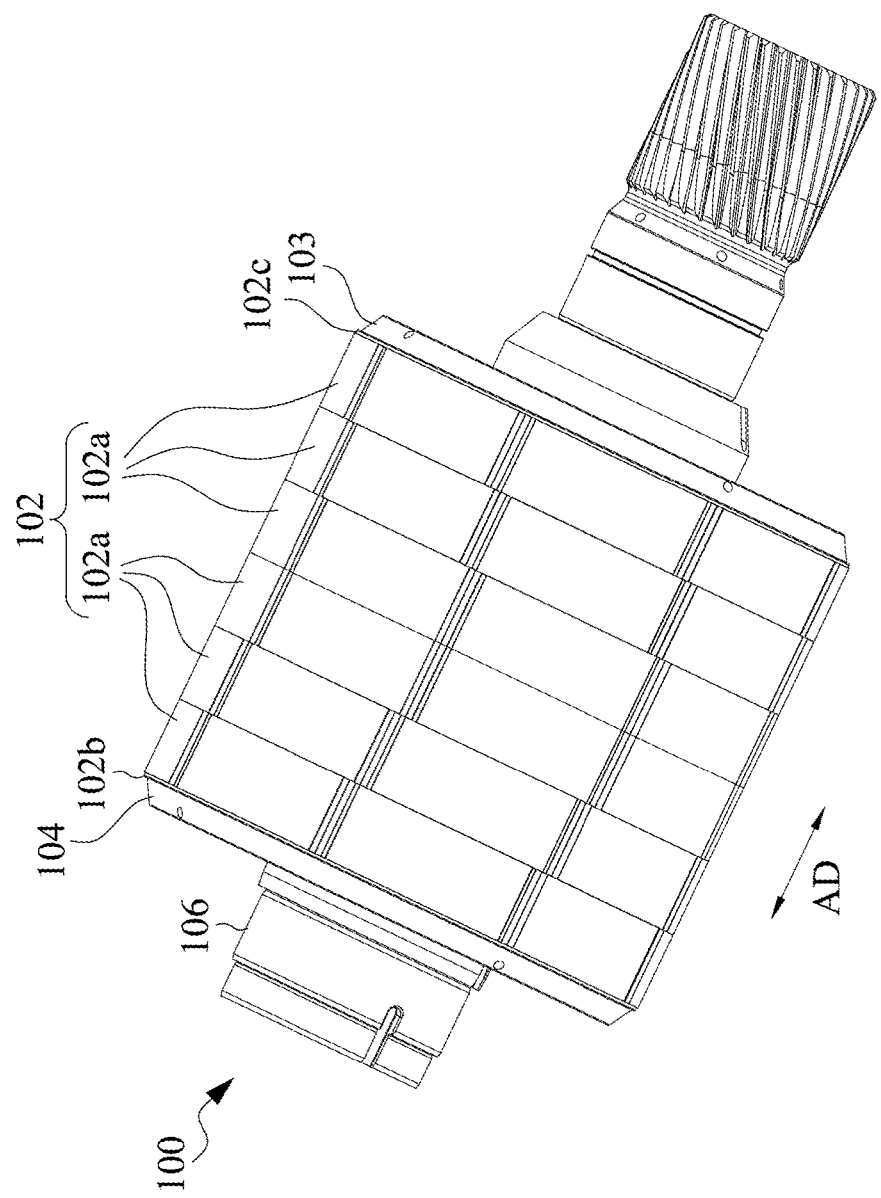
FIG. 1 illustrates a perspective view of a rotor structure according to one embodiment of the present disclosure.
Figure 2:
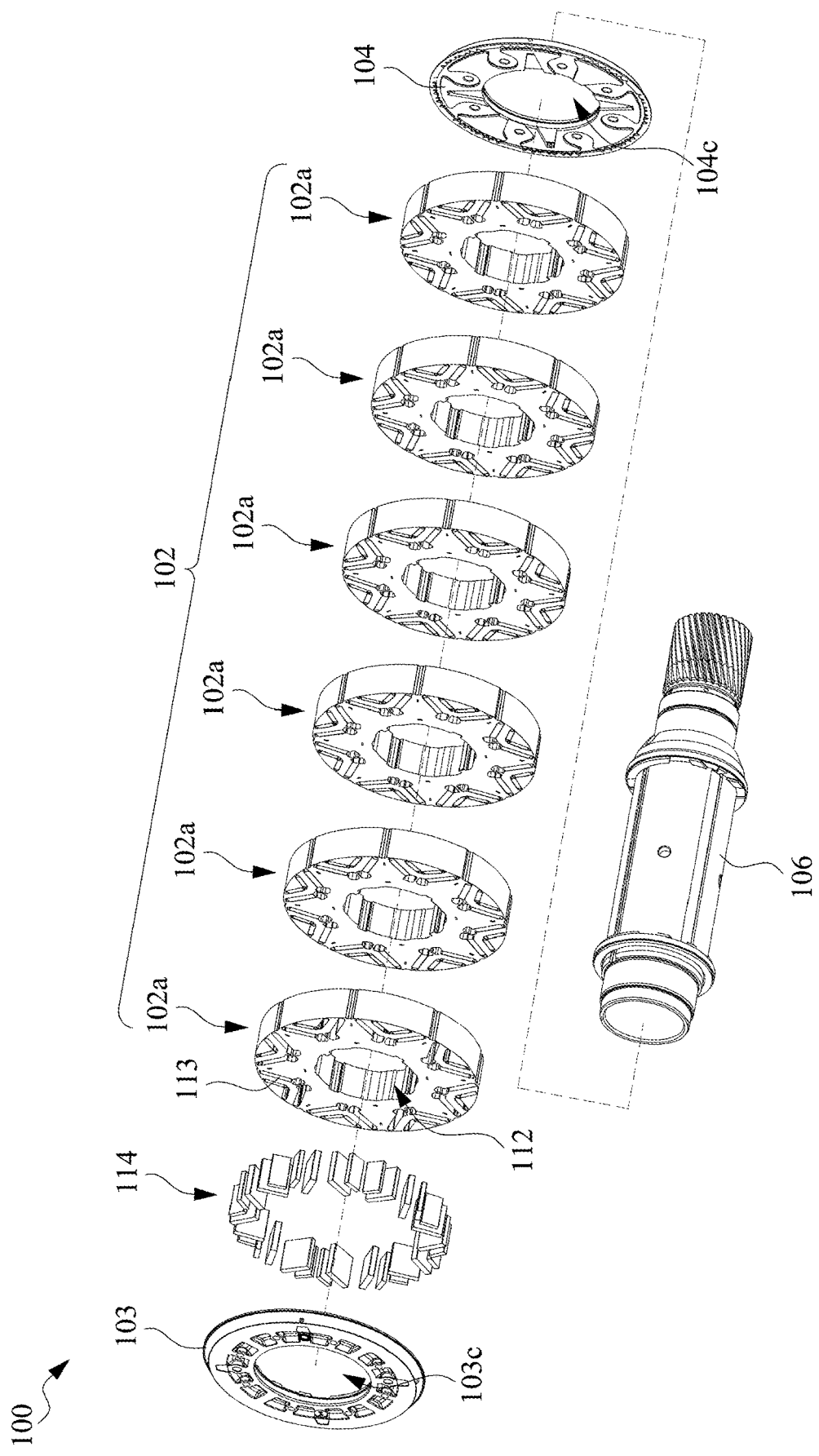
FIG. 2 illustrates an exploded view of a rotor structure according to one embodiment of the present disclosure.

Reference is made to FIGS. 1 and 2, FIG. 1 illustrates a perspective view of a rotor structure according to one embodiment of the present disclosure, and FIG. 2 illustrates an exploded view of a rotor structure 100 according to one embodiment of the present disclosure. The rotor structure 100 in FIG. 1 is obtained after the components of the rotor structure in FIG. 2 are assembled. The rotor structure 100 includes a silicon steel sheet laminated structure 102, a lower end plate 103, an upper end plate 104, a rotation shaft 106, an injection molding material and a thermoset plastic key. The rotation shaft 106 is installed through the shaft holes of the silicon steel sheet laminated structure 102, the lower end plate 103 and the upper end plate 104. The upper end plate 104 and the lower end plate 103 are arranged on the two opposite ends of the silicon steel sheet laminated structure 102 in an axial direction AD, that is, the upper end plate 104 is arranged on an end surface 102b of one end of the silicon steel sheet laminated structure 102, and the lower end plate 103 is arranged on an end surface 102c of the other end of the silicon steel sheet laminated structure 102. The silicon steel sheet laminated structure 102 is formed by stacking a plurality of silicon steel sheets 102a. The thermoset plastic key will be explained in detail in the following paragraphs.

Figure 3:
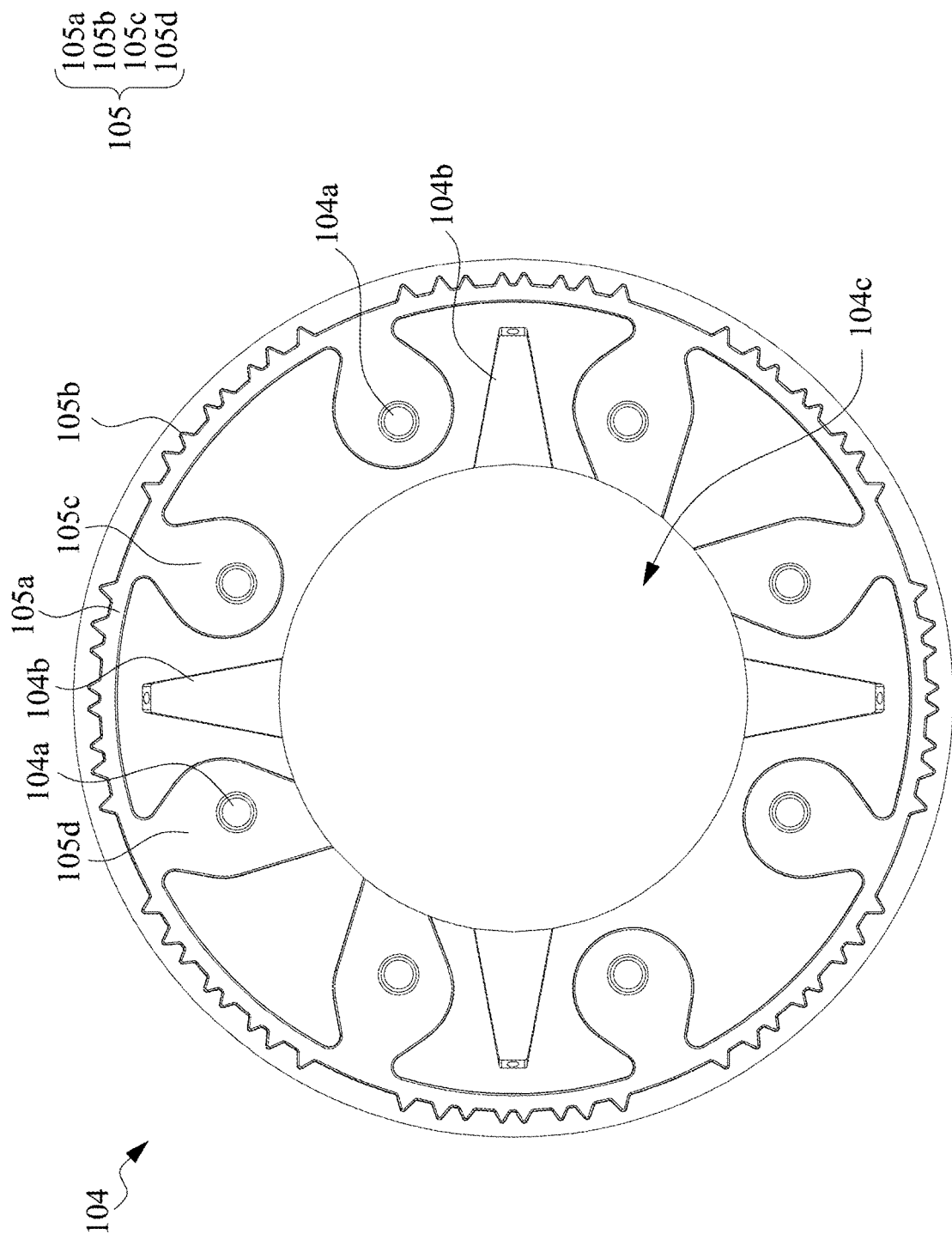
FIG. 3 illustrates a planner view of an upper end plate according to one embodiment of the present disclosure.

Reference is made to FIG. 3, which illustrates a planner view of an upper end plate according to one embodiment of the present disclosure. In this embodiment, the upper end plate 104 is a tool for injection molding material poured from it, so the upper end plate 104 is recessed with an end plate shaft hole 104c, at least one injection port 104a and at least one end plate injection route 105. The at least one injection port 104a is fluidly communicable with the at least one end plate injection route 105 and an axial-direction injection passageway, and these injection ports 104a are through holes passing through the upper end plate 104. It should be noted that the same structured injection port and end plate injection route can be formed on the lower end plate 103. For the convenience of explanation and understanding, the description and drawings will describe the structure of the upper end plate 104, but not intended to limit the present disclosure. The end plate injection route 105 includes a circular channel 105a, a plurality of tooth structures 105b, a plurality of first perfusion channels 105c, and a plurality of second perfusion channels 105d. The design feature of circular channel 105a can make the injection molding in the rotor structure more uniform and reduce resistance in the flow channel. In some embodiments of the present disclosure, a plurality of tooth structures 105b are formed on an outer side of the circular channel 105a (the side away from the end plate shaft hole 104c in the radial direction) and arranged in a circumferential direction of the rotor structure, and the tooth structures 105b are fluidly communicable with the circular channel 105a, and the design of the tooth structures 105b makes it easy for the injection molding material to flow through the tooth structures 105b to an edge of the magnet slots (such as the air slot 113c in FIG. 5). The design feature of the tooth structures 105b allows the end plate injection route 105 to reduce the injection resistance, and cooperates with the circular channel 105a to make the injection molding material easy to move to the outside of the circular channel 105a such that the injection molding material can be evenly distributed. In some embodiments of the present disclosure, the plurality of first and second perfusion channels (105c, 105d) are located inside the circular channel 105a (the side adjacent to the end plate shaft hole 104c in the radial direction), and the first and second perfusion channels (105c, 105d) are all fluidly communicable with the circular channel 105a, so that the injection molding material can flow therein. In some embodiments of the present disclosure, the first and second perfusion channels (105c, 105d) both have a profile of a water droplet, wherein the first perfusion channels 105c is fluidly communicable with the circular channel 105a but not fluidly communicable with the end plate shaft hole 104c. The second perfusion channels 105d has one side fluidly communicable with the circular channel 105a, and the other side fluidly communicable with the end plate shaft hole 104c. In some embodiments of the present disclosure, there are four pairs of first and second perfusion channels (105c, 105d) inside the circular channel 105a. In some embodiments of the present disclosure, the injection port 104a is located in each of the first perfusion channels 105c or the second perfusion channels 105d. In some embodiments of the present disclosure, the upper end plate 104 is also recessed with a cooling channel 104b between each pair of first and second perfusion channels (105c, 105d), and the cooling channels 104b and the end plate injection route 105 are equipped with different functions, the cooling channels 104b are used for cooling oil circulation, and the end plate injection route 105 is used for injecting injection molding material into the rotor structure, so they are not fluidly communicable with each other. In some embodiments of the present disclosure, the segments where the tooth structures 105b are fluidly communicable with the circular channel 105a and the segments where the first and second perfusion channels (105c, 105d) are fluidly communicable with the circular channel 105a are not aligned with each other. In some embodiments of the present disclosure, the cooling channels 104b are located between each pair of first and second perfusion channels (105c, 105d) and surrounded by the circular channel 105a, so the cooling oil in the cooling channels 104b is not easily to leak to an outer circumference during rotor operation. In some embodiments of the present disclosure, the upper end plate 104 only needs at least one injection port 104a, the circular channel 105a and the first and second perfusion channels (105c, 105d) to fill the injection molding material to the entire silicon steel sheet laminated structure 102. In some embodiments of the present disclosure, the upper end plate 104 is provided with eight injection ports 104a for filling injection molding material at the same time, so that the injection molding material can be evenly distributed to the space required to be filled in the rotor structure.

Figure 4:
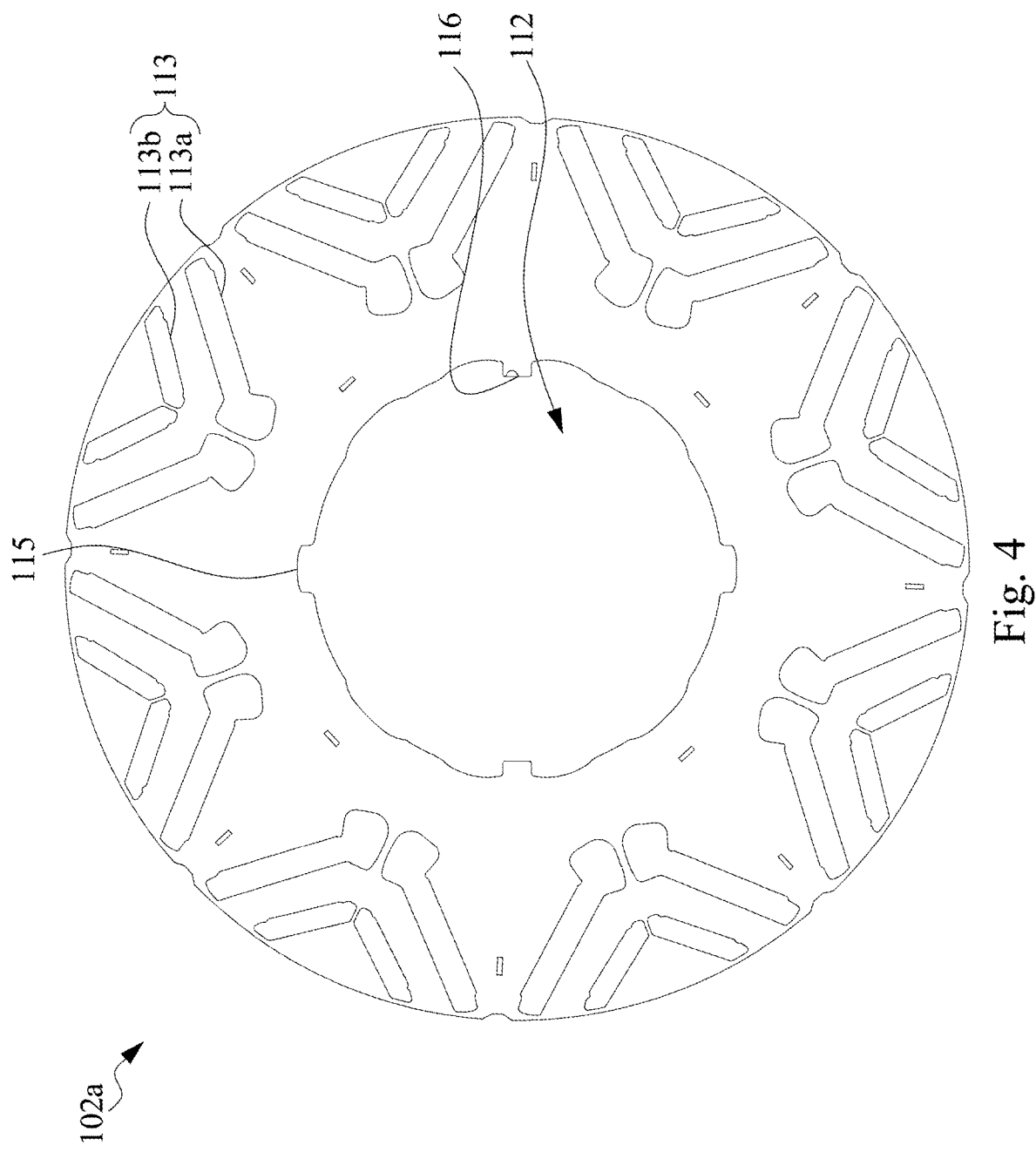
FIG. 4 illustrates a planner view of a single silicon steel sheet according to one embodiment of the present disclosure.

Reference is made to FIG. 4, which illustrates a planner view of a single silicon steel sheet 102a according to one embodiment of the present disclosure. Each silicon steel sheet 102a is provided with a plurality of magnet slots 113 that extends in the axial direction to accommodate magnets. The magnet slots 113 include first magnet slots 113a with a larger size and second magnet slots 113b with a smaller size. In some embodiments of the present disclosure, the first magnet slots 113a are closer to the rotation shaft 106, and the second magnet slots 113b are farther away from the rotation shaft 106. In some embodiments of the present disclosure, each silicon steel sheet 102a has a shaft hole 112 and at least one silicon steel sheet matching portion 115, and the silicon steel sheet matching portion 115 is fluidly communicable with the shaft hole 112. In some embodiments of the present disclosure, the shaft hole 112 of each silicon steel sheet 102a has at least one silicon steel sheet matching portion 115 recessed away from the center of the silicon steel sheet 102a and at least one metal key 116 is protruded toward the center of the silicon steel sheet 102a. In some embodiments of the present disclosure, the shaft hole 112 of each silicon steel sheet 102a has two silicon steel sheet matching portions 115 and two metal keys 116, and the positions of the two silicon steel sheet matching portions 115 of the silicon steel sheet 102a are located with 180 degrees difference viewed in the axial direction, and the positions of the two metal keys 116 are also located with 180 degrees difference viewed in the axial direction. In some embodiments of the present disclosure, the shaft hole 112 of each silicon steel sheet 102a is provided with two silicon steel sheet matching portions 115 and two metal keys 116, and each silicon steel sheet matching portion 115 is located between the two metal keys 116, each metal key 116 is located between two silicon steel sheet matching portions 115, that is, the silicon steel sheet matching portions 115 and the metal keys 116 are alternately arranged, and the adjacent silicon steel sheet matching portion 115 and silicon steel sheet 102a are located with 90 degrees difference viewed in the axial direction. In some embodiments of the present disclosure, the silicon steel sheet matching portion 115 is a groove recessed from the shaft hole 112. In some embodiments of the present disclosure, the silicon steel sheet matching portions 115 on the two outermost layers of the silicon steel sheet 102a in the axial direction is fluidly communicable with the second perfusion channels 105d of the upper end plate 104 or lower end plate 103 (also refer to FIGS. 1-4). In some embodiments of the present disclosure, the magnet slots 113 of the two outermost layers of silicon steel sheet 102a in the axial direction are fluidly communicable with the circular channel 105a, tooth structures 105b, first perfusion channels 105c and second perfusion channels 105d of the upper end plate 104 or lower end plate 103 (also refer to FIGS. 1-4).

Figure 5:
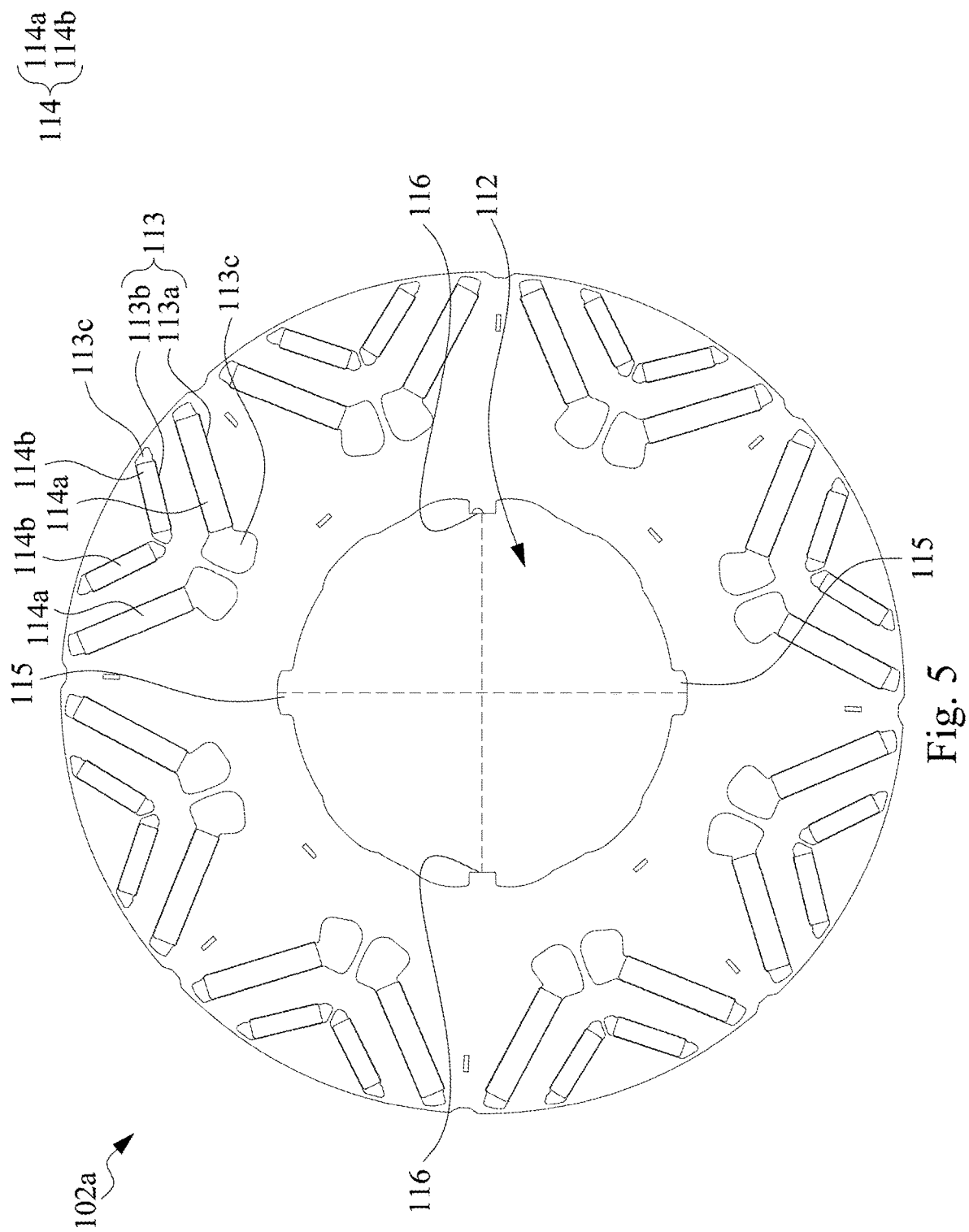
FIG. 5 illustrates a planner view of a rotor structure with magnets according to one embodiment of the present disclosure.

Reference is made to FIG. 5, which illustrates a planner view of a rotor structure with magnets according to one embodiment of the present disclosure. Each silicon steel sheet 102a is provided with a plurality of magnet slots 113 formed in the axial direction and arranged along a circumference of the silicon steel sheet 102a to accommodate a plurality of magnets 114. The magnet slots 113 include first magnet slots 113a with a larger size for accommodating first magnets 114a with a larger size, and second magnet slots 113b with a smaller size for accommodating second magnets 114b with a smaller size. In some embodiments of the present disclosure, each silicon steel sheet 102a has a shaft hole 112 and at least one silicon steel sheet matching portion 115, and the silicon steel sheet matching portion 115 is connected to or fluidly communicable with the shaft hole 112. Viewed in the axial direction, the cross-sectional area of the magnet slots 113 is larger than that of the magnet 114. In some embodiments of the present disclosure, the air slots 113c connected to the outer sides of the first and second magnet slots (113a, 113b) can be used as injection molding channels passing through the laminated silicon steel sheets 102a. In some embodiments of the present disclosure, the shaft hole 112 of each silicon steel sheet 102a has at least one silicon steel sheet matching portion 115 and at least one metal key 116. In some embodiments of the present disclosure, the shaft hole 112 of each silicon steel sheet 102a has two silicon steel sheet matching portions 115 and two metal keys 116. Specifically, when the silicon steel sheet 102a is viewed in the axial direction, the positions of the two silicon steel sheet matching portions 115 are located with 180 degrees difference, the positions of the two metal keys 116 are located with 180 degrees difference, and a connection line between the two silicon steel sheet matching portions 115 and a connection line between the two metal keys 116 intersect vertically.

Figure 6:
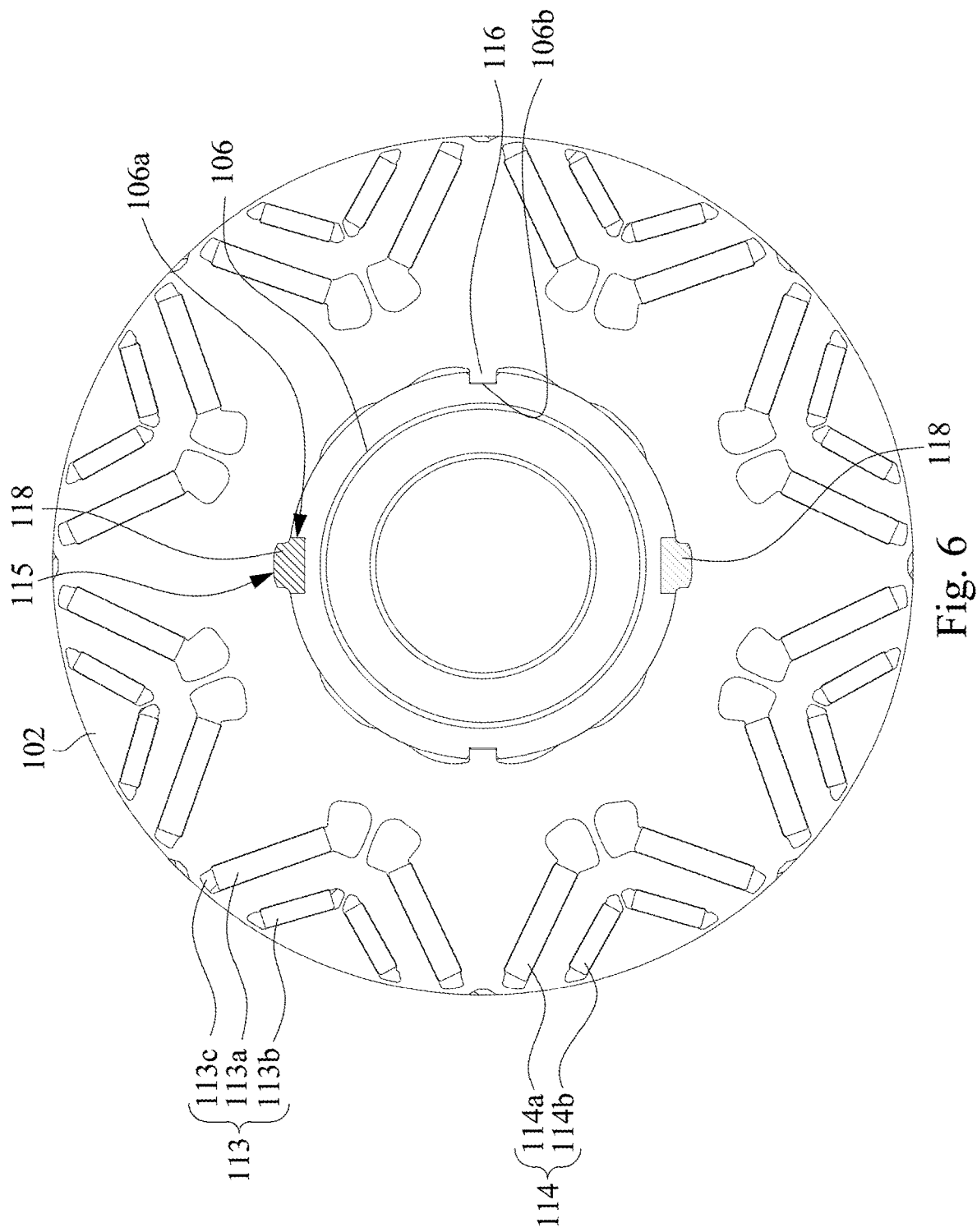
FIG. 6 illustrates a planner view of a silicon steel sheet laminated structure installed with a rotation shaft according to one embodiment of the present disclosure.

Reference is made to FIG. 6, which illustrates a planner view of a silicon steel sheet laminated structure installed with a rotation shaft according to one embodiment of the present disclosure. The silicon steel sheet laminated structure 102 is formed with a plurality of silicon steel sheets 102a sleeved on the rotation shaft 106 and stacked. The silicon steel sheet matching portions 115 of the silicon steel sheets 102a are aligned with the shaft matching portion 106a of the rotation shaft 106 to form an axial-direction injection passageway in the axial direction. The metal keys 116 of the silicon steel sheets 102a engage the rotation shaft keyway 106b of the rotation shaft 106, and the rotation shaft keyway 106b is a structure formed on the surface of the rotation shaft 106 and extending in the axial direction. In some embodiments of the present disclosure, the silicon steel sheet matching portion 115 is a concave groove on the shaft hole 112, and the shaft matching portion 106a is a concave groove on the rotation shaft 106. When an injection molding material of a thermosetting plastic is injected into the axial-direction injection passageway formed by aligned pairs of the silicon steel sheet matching portions 115 and the shaft matching portion 106a and hardened or solidified, a thermoset plastic key 118 is formed in the axial-direction injection passageway as a rotation positioning key between the silicon steel sheet laminated structure 102 and the rotation shaft 106. Different from the metal rotation positioning key formed by the metal key 116 of the silicon steel sheet 102a engaged with the rotation shaft keyway 106b of the rotation shaft 106, the thermoset plastic key 118 is installed into the axial-direction injection passageway formed after the silicon steel sheet laminated structure 102 sleeved on the rotation shaft 106 by transfer molding in the parallel silicon steel sheet matching portions 115 and shaft matching portion 106a. The thermoset plastic key 118 can provide better tight fit between the silicon steel sheet matching portions 115 and the shaft matching portion 106a to achieve the rotation positioning required for the operation of the rotor structure, and reduces the deformation and residual stress of the silicon steel sheet 102a when an amount of interference between the silicon steel sheet laminated structure 102 and the rotation shaft 106 is too large. In some embodiments of the present disclosure, the rotation positioning keys provided by the thermoset plastic key 118 and the metal key 116 coexist between the rotation shaft 106 and the silicon steel sheet laminated structure 102. In some embodiments of the present disclosure, only the rotation positioning key provided by the thermoset plastic key 118 exists between the rotation shaft 106 and the silicon steel sheet laminated structure 102, and the rotation positioning key provided by the metal key 116 is removed. In some embodiments of the present disclosure, there are two thermoset plastic keys 118 and two metal keys 116 between the rotation shaft 106 and the silicon steel sheet laminated structure 102. The positions of the two thermoset plastic keys 118 are located with 180 degrees difference, and the positions of the two metal keys 116 are located with 180 degrees difference.

Figure 7:
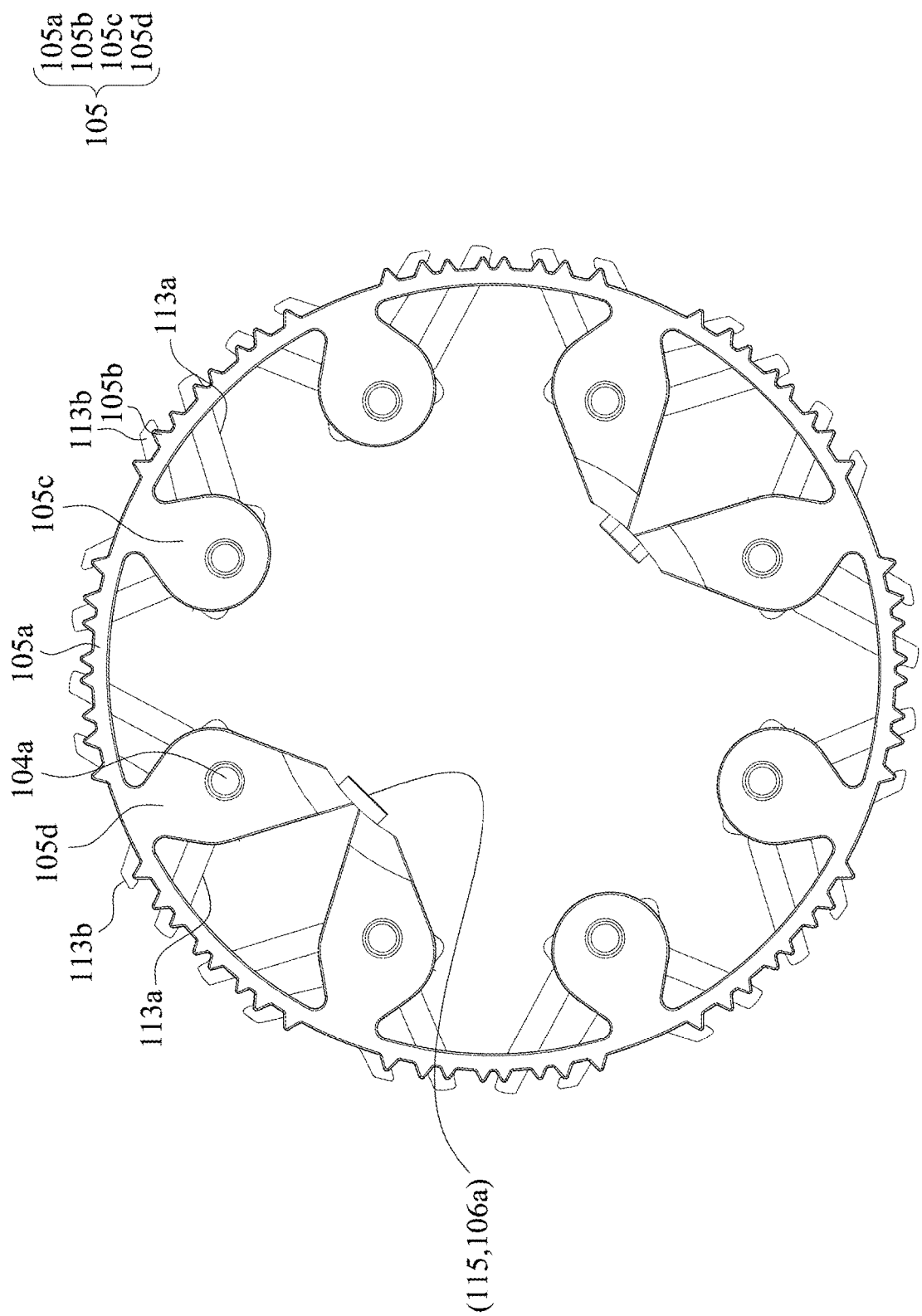
FIG. 7 illustrates a planner view of an end plate injection route of a rotor structure according to one embodiment of the present disclosure.
Figure 8:
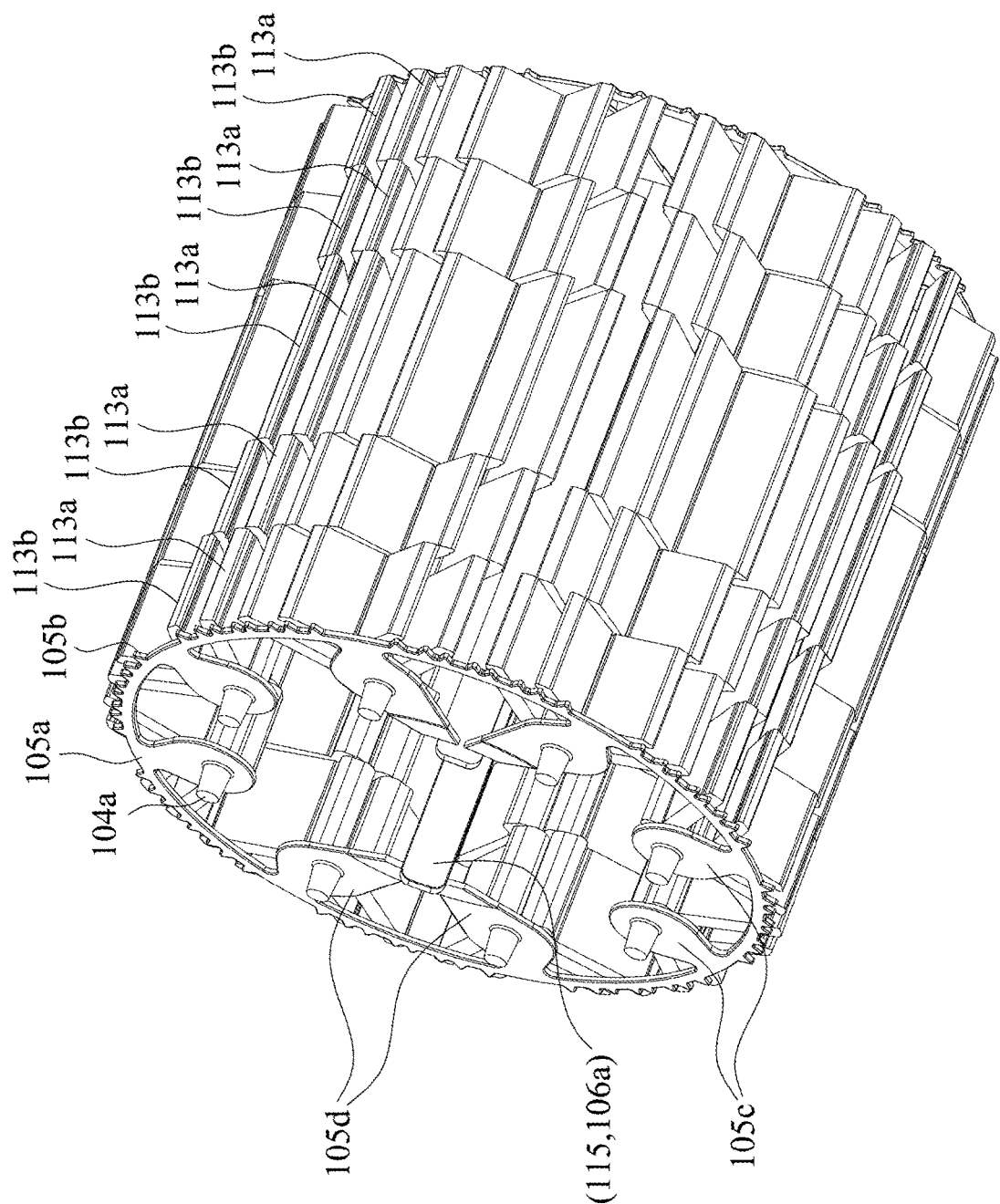
FIG. 8 illustrates a perspective view of an end plate injection route and axial-direction injection passageway for a complete silicon steel sheet laminated structure according to one embodiment of the present disclosure.

Reference is made to FIGS. 7 and 8, FIG. 7 illustrates a planner view of an end plate injection route of a rotor structure according to one embodiment of the present disclosure, and FIG. 8 illustrates a perspective view of an end plate injection route and axial-direction injection passageway for a complete silicon steel sheet laminated structure according to one embodiment of the present disclosure. This end plate injection route is schematically labeled with corresponding reference numbers in FIGS. 3 to 6. When thermosetting plastics, i.e., injection molding material, are simultaneously injected into the end plate injection route through the eight injection ports 104a of the end plate, the injection molding material is first flowed into the first perfusion channels 105c or second perfusion channels 105d, and a part of the injection molding material is passed through the first perfusion channels 105c or the second perfusion channels 105d and flowed directly into the first magnet slots 113a, the second magnet slots 113b and part of the air slots 113c inside the circular channel 105a. In addition, another part of the injection molding material is flowed out through the circular channel 105a to reach the tooth structures 105b, and flowed through the tooth structures 105b into the first magnet slots 113a, the second magnet slots 113b and part of the air slots 113c outside the circular channel 105a. In addition, another part of the injection molding material is flowed into the axial-direction injection passageway formed by an aligned pair of the silicon steel sheet matching portions 115 of the silicon steel sheets 102a and the shaft matching portion 106a of the rotation shaft 106 through the second perfusion channels 105d. Since the first magnet slots 113a of multiple silicon steel sheets 102a are axially connected (i.e., fluidly communicable) to one another, the second magnet slots 113b are also axially connected (i.e., fluidly communicable) to one another, and are connected (i.e., fluidly communicable) to the end plate injection route 105 of the upper and lower end plates. Based on the magnetic force distribution characteristics, the magnet slots 113 between the stacked silicon steel sheets 102a are arranged in a dislocation manner, and the magnet slots 113 between the silicon steel sheets 102a of each layer are partially connected to allow the injection molding material to pass through, so that the injection molding routes of the first and second magnet slots (113a, 113b) are also arranged in offset positions. The first and second magnet slots (113 *a*, 113*b*) based on the dislocation arrangement help to improve the magnetic performance of the magnets accommodated in the magnet slots. It should be noted that the silicon steel sheet matching portions 115 of all layers of silicon steel sheet 102*a* are aligned with one another (for example, the grooves of the silicon steel sheet matching portions 115 of the silicon steel sheets 102*a* are aligned with one another), that is, if viewed in the axial direction, the silicon steel sheet matching portions 115 of all the silicon steel sheets 102*a* is an aligned and penetrated structure, and combined with a corresponding shaft matching portion 106*a* to form an aligned and penetrated axial-direction injection passageway. In addition, the end plate injection route 105 of the upper and lower end plates is also fluidly communicable with the axial-direction injection passageway formed by the silicon steel sheet matching portions 115 of the silicon steel sheets 102*a* and the shaft matching portion 106*a* of the rotation shaft 106. In some embodiments of the present disclosure, the injection port 104*a* is arranged radially between the first and second magnet slots (113*a*, 113*b*) and the silicon steel sheet matching portion 115, so that the injection molding material can be flowed evenly.

Figure 9:
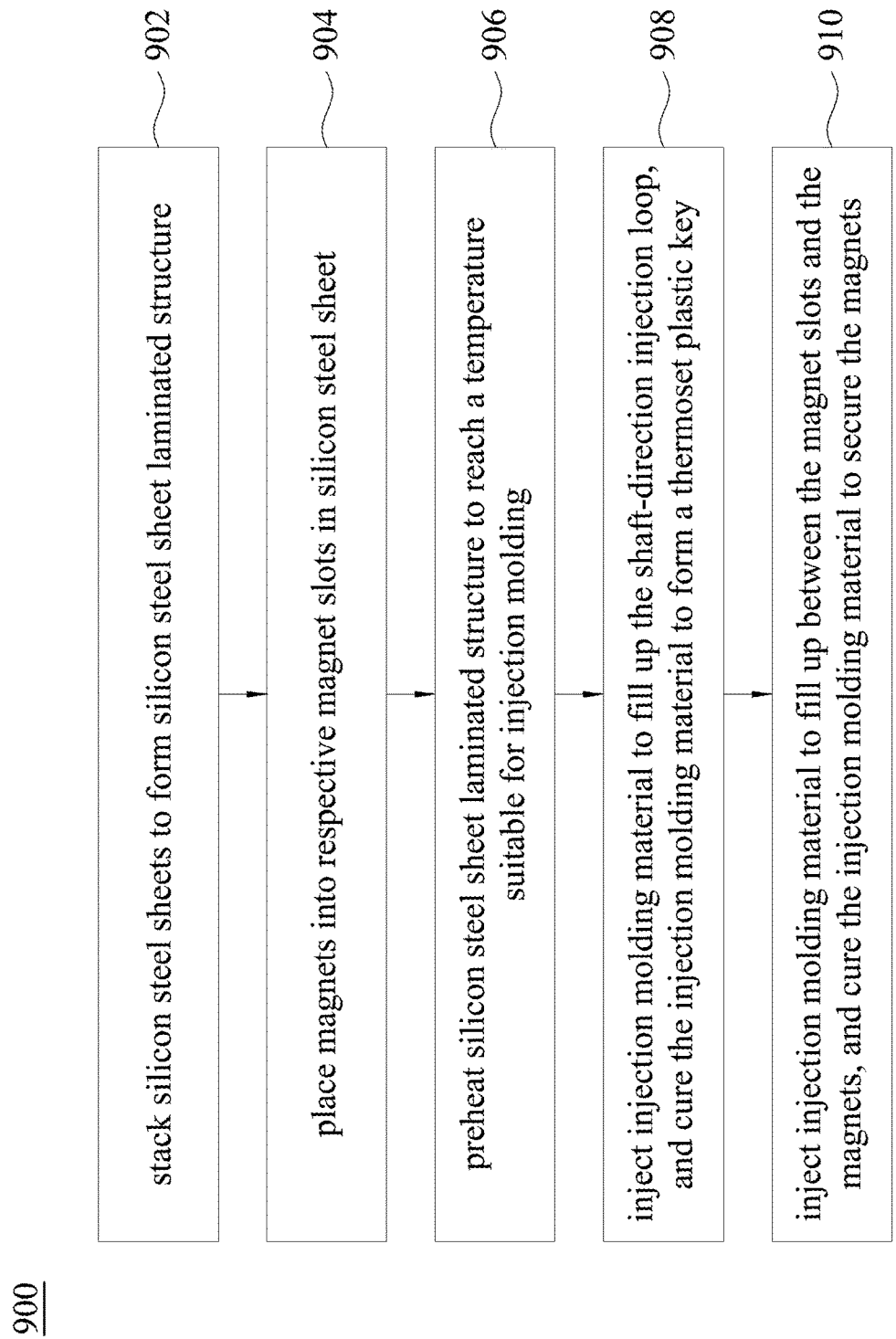
FIG. 9 illustrates a processing flow chart of manufacturing a rotor structure according to one embodiment of the present disclosure.

Reference is made to FIG. 9, which illustrates a rotor manufacturing process 900 for a rotor structure according to one embodiment of the present disclosure. In step 902 (referring to both FIG. 1 and FIG. 2), the rotor manufacturing process stacks a plurality of silicon steel sheets 102*a* in sequence to form a silicon steel sheet laminated structure 102. In step 904, the rotor manufacturing process places a plurality of magnets into respective magnet slots 113 in each layer of the silicon steel sheet 102*a*. The step 902 and the step 904 are repeated and alternately performed. The execution details of steps 902 and 904 may secure the rotation shaft 106 vertically on a base, and firstly put the lower end plate 103 on the rotation shaft 106 through its end plate shaft hole 103*c*. The single silicon steel sheet 102*a* is sleeved on the rotation shaft 106 through its shaft hole 112 sequentially (for example, use a robot arm to clamp the silicon steel sheet 102*a*), and the magnet 114 is placed in the magnet slots 113 corresponding to the silicon steel sheet 102*a* of this layer when stacking each layer of silicon steel sheet 102*a*, this step needs to be repeated several times, and the required number of silicon steel sheets 102*a* are all sleeved on the rotation shaft 106 to form the silicon steel sheet laminated structure 102. When performing step 902 and step 904, it is necessary to align the silicon steel sheet matching portion 115 of each layer of silicon steel sheet 102*a* with the shaft matching portion 106*a* of the rotation shaft 106 to form an axial-direction injection passageway. Finally, the upper end plate 104 is sleeved on the rotation shaft 106 through its end plate shaft hole 104*c*, so that a plurality of silicon steel sheets 102*a* equipped with magnets 114 are stacked between the upper end plate 104 and the lower end plate 103 to form a rotor structure. In other embodiments, step 902 and step 904 can be repeated and alternately performed, for example, the silicon steel sheet laminated structure 102 is formed first, and then an upper end plate 104 and a lower end plate 103 are stacked axially at two opposite ends of the silicon steel sheet laminated structure 102. In some embodiments of the present disclosure, the upper, lower end plates, silicon steel sheets and the shaft can be assembled by using interference fitting, e.g., preheating the upper, lower end plates or silicon steel sheets to a higher temperature to expand the shaft hole, or place the shaft in liquid nitrogen to shrink a diameter of the shaft, so that the upper, lower end plates, and silicon steel sheets can be sleeved on the rotation shaft through the shaft hole. When the upper, lower end plates or silicon steel sheets and the rotating shaft recover to an ambient temperature, the upper, lower end plates or silicon steel sheets and the rotating shaft form an interference fitting and all fix, which is referred as "installing the shaft".

Then in step 906 (referring to both FIGS. 1 and 2), the rotor manufacturing process preheats the silicon steel sheet laminated structure 102 to reach a temperature suitable for injection molding. The execution details of step 906 can be pressed axially on the laminated multiple silicon steel sheets 102*a* through the upper end plate 104 and lower end plate 103, and the rotor structure 100 and its silicon steel sheet laminated structure 102 are preheated by the inner and outer heating coils. The action of applying pressure in the axial direction makes the gap between the silicon steel sheets 102*a* as small as possible when the silicon steel sheet 102*a* and the rotation shaft 106 recover to an ambient temperature.

In some embodiments of the present disclosure, in step 902, a dummy shaft (not shown) can be inserted first when stacking the silicon steel sheets 102*a*, and after step 904, the dummy shaft is replaced with the rotation shaft 106.

Then in step 908 (referring to FIGS. 2 to 8), the rotor manufacturing process injects injection molding material from one end of the silicon steel sheet laminated structure 102 in the axial direction to fill into the axial-direction injection passageway, and hardens the injection molding material to form a thermoset plastic key 118 is in the axial-direction injection passageway. The execution details of step 908 can use a molding jig to force the injection molding material injected into the axial-direction injection passageway formed by an aligned pairs of the silicon steel sheet matching portions 115 and the shaft matching portion 106*a* through the injection port 104*a* and the end plate injection route 105 of the upper end plate 104. The injection molding (transfer molding) process pours the injection molding material into the silicon steel sheet laminated structure 102 and then hardens the injection molding material to form a thermoset plastic key 118 to fill the axial-direction injection passageway. Then in step 910 (also referring to FIGS. 2 to 8), the injection molding material is injected through the injection port 104*a*, the end plate injection route 105 and the magnet slots 113 to fill the gap between the magnet slots and the magnet, and the injection molding material is then cured so as to form a hardened thermosetting plastic to glue and fix or secure the magnet 114 in the magnet slots 113.

The rotor manufacturing process may further include magnetizing the magnet 114 so that the magnet 114 can have the magnetic poles and magnetic force required by the rotor structure. The step of magnetizing the magnet can be performed before step 904 (pre-magnetization process), or after step 910 (post-magnetization process), wherein the post-magnetization process is easier to fill the magnet slots when stacking silicon steel sheets.

The rotor manufacturing process may further include driving the rotor to rotate to perform a dynamic balance test, so as to test whether the injection molding material is evenly filled in the rotor. The step of the dynamic balance test should be performed after the injection molding material is completely hardened or cured to fix the magnets 114 in the magnet slots 113 (i.e., after step 910).

The rotor manufacturing process may further include dimensional measurement of the rotor after the dynamic balance test, such as measuring an axial length of the rotor and/or whether a diameter of the silicon steel sheet laminated structure meets the requirements.

The rotor structure disclosed herein is used to fill the magnet slots and secure the magnets through a high-temperature injection molding of thermosetting plastics and to fill the gaps after hardening or curing. The manufacturing process of the rotor structure is simpler than the conventional way of applying magnet glue on a single silicon steel sheet to bond a magnet and then laminating multiple sheets. Thermosetting plastic can fill the gaps of the magnet slots and fix the magnet so as to reduce the risk of magnet fracture, and the strength of thermosetting plastic at high temperature is better than that of magnet glue. The manufacturing process of the rotor structure utilizes the axial force applied by the machine to perform the injection molding and heating until hardening or curing steps such that it is less likely to have plastic overflowed to cause gaps between the silicon steel sheets, which can reduce the risk of cooling oil leakage when the rotor is operating. The process of rotor structure can injection mold multiple laminated silicon steel sheets at one time. Compared with the magnet glue, which can only be coated in a single layer and then laminated in multiple layers, the production time is much shorter. The thermoset plastic key of the rotor structure can tightly fill the keyway fitting part on the shaft, and there is no such issue of unilateral contact force applied to the metal key. In some embodiments, multiple thermoset plastic keys can be used to disperse the motor torque to increase the safety of the motor. Thermoset plastic key can also replace the metal key and reduce design difficulty.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A rotor structure comprising:
   a silicon steel sheet laminated structure comprising a plurality of silicon steel sheets, wherein each silicon steel sheet has a shaft hole, at least one silicon steel sheet matching portion and a plurality of magnet slots for accommodating a plurality of magnets, and the at least one silicon steel sheet matching portion is connected to the shaft hole;
   an upper end plate and a lower end plate axially disposed at two opposite ends of the silicon steel sheet laminated structure, and the upper end plate or the lower end plate is recessed with an end plate shaft hole, at least one injection port and at least one end plate injection route;
   a rotation shaft disposed through the shaft holes and the end plate shaft holes, the rotation shaft has at least one shaft matching portion aligned with the silicon steel sheet matching portions of the silicon steel sheets to form an axial-direction injection passageway, wherein the at least one injection port is fluidly communicable with the at least one end plate injection route and the axial-direction injection passageway, and the at least one end plate injection route is fluidly communicable with the axial-direction injection passageway and the magnet slots; and
   a thermoset plastic key disposed in the axial-direction injection passageway formed by the at least one shaft matching portion aligned with the silicon steel sheet matching portions, and an injection molding material filled between the magnet slots and the magnets, and the injection molding material being cured to secure the magnets, wherein each silicon steel sheet matching portion is a concave groove on the shaft hole, and the at least one shaft matching portion is a concave groove on the rotation shaft.

2. The rotor structure of claim 1, wherein the rotation shaft further has at least one rotation shaft keyway extending in an axial direction, each of the silicon steel sheets has at least one metal key connected to the shaft hole, wherein the metal keys of the silicon steel sheets engaged with the at least one rotation shaft keyway, the metal keys of the silicon steel sheets are aligned with one another.

3. The rotor structure of claim 1, wherein the magnet slots of the silicon steel sheets are misaligned with one another, and the silicon steel sheet matching portions of the silicon steel sheets are aligned with one another.

4. The rotor structure of claim 1, wherein the at least one end plate injection route comprises a circular channel, a plurality of tooth structures, a plurality of first perfusion channels and a plurality of second perfusion channels.

5. The rotor structure of claim 4, wherein the tooth structures are formed at a side of the circular channel that is away from the end plate shaft hole, and the tooth structures are disposed in a circumferential direction of the upper end plate or the lower end plate.

6. The rotor structure of claim 5, wherein the first perfusion channels and the second perfusion channels are located at a side of the circular channel that is adjacent to the end plate shaft hole, and fluidly communicable with the circular channel.

7. The rotor structure of claim 6, wherein associated ones of the magnet slots of the silicon steel sheets are partially aligned in an axial direction, wherein the magnet slots at an outermost layer in the axial direction are fluidly communicable with the circular channel, the tooth structures, the first perfusion channels and the second perfusion channels.

8. The rotor structure of claim 6, wherein the at least one silicon steel sheet matching portion of an outermost silicon steel sheet in an axial direction is fluidly communicable with the second perfusion channels.

9. The rotor structure of claim 6, wherein each of the silicon steel sheets has a plurality of cooling channels each located between a corresponding pair of the first perfusion channels and the second perfusion channels, and surrounded by the circular channel.

10. The rotor structure of claim 1, wherein the at least one injection port is disposed radially between the magnet slots and the silicon steel sheet matching portion, and is arranged in a circumferential direction of the upper end plate or the lower end plate.

11. A rotor manufacturing method comprising steps of:
   (a) stacking a plurality of silicon steel sheets in sequence to form a silicon steel sheet laminated structure, and then stacking an upper end plate and a lower end plate at two opposite ends of the silicon steel sheet laminated structure in an axial direction, wherein each of the silicon steel sheets has a shaft hole, at least one silicon steel sheet matching portion, and a plurality of magnet slots, the at least one silicon steel sheet matching portion is connected to the shaft hole, and the silicon steel sheet matching portions in the silicon steel sheets are combined with at least one shaft matching portion of a rotation shaft to form an axial-direction injection passageway, wherein the upper end plate or the lower end plate is recessed with an end plate shaft hole, at least one injection port and at least one end plate injection route, the at least one injection port is fluidly communicable with the at least one end plate injection route and the axial-direction injection passageway;

(b) placing a plurality of magnets into the magnet slots respectively, wherein the at least one end plate injection route is fluidly communicable with the axial-direction injection passageway and the magnet slots;

(c) preheating the silicon steel sheet laminated structure to reach a temperature suitable for injection molding;

(d) injecting injection molding material from one end of the silicon steel sheet laminated structure in the axial direction to fill the axial-direction injection passageway, and curing the injection molding material to form a thermoset plastic key in the axial-direction injection passageway formed by the at least one shaft matching portion aligned with the silicon steel sheet matching portions, wherein each silicon steel sheet matching portion is a concave groove on the shaft hole, and the at least one shaft matching portion is a concave groove on the rotation shaft; and (e) injecting injection molding material to fill up between the magnet slots and the magnets, and curing the injection molding material to secure the magnets.

12. The rotor manufacturing method of claim 11, wherein the step (a) inserts a dummy shaft when stacking the silicon steel sheets, and replaces the dummy shaft with the rotation shaft after the step (b).

13. The rotor manufacturing method of claim 11, wherein the magnets are magnetized after the step (e).

14. The rotor manufacturing method of claim 11, wherein the magnet slots of the silicon steel sheets are misaligned with one another, and the silicon steel sheet matching portions of the silicon steel sheets are aligned with one another.

15. The rotor manufacturing method of claim 11, wherein the at least one end plate injection route comprises a circular channel, a plurality of tooth structures, a plurality of first perfusion channels and a plurality of second perfusion channels.

16. The rotor manufacturing method of claim 15, wherein the tooth structures are formed at a side of the circular channel that is away from the end plate shaft hole, and the tooth structures are disposed in a circumferential direction of the upper end plate or the lower end plate.

17. The rotor manufacturing method of claim 16, wherein the first perfusion channels and the second perfusion channels are located at a side of the circular channel that is adjacent to the end plate shaft hole, and fluidly communicable with the circular channel.

* * * * *